Sept. 9, 1958 J. POLONSKY ET AL 2,851,520

DEVICES FOR RESTORING MEAN SHADING IN TELEVISION TRANSMITTERS

Original Filed Nov. 14, 1952 2 Sheets-Sheet 1

INVENTORS
JOSEPH POLONSKY
GERARD MELCHIOR
BY Paul B. Hunter
Attorney

INVENTORS
JOSEPH POLONSKY
GERARD MELCHIOR
BY Paul B. Hunter
Attorney

United States Patent Office 2,851,520

Patented Sept. 9, 1958

2,851,520

DEVICES FOR RESTORING MEAN SHADING IN TELEVISION TRANSMITTERS

Joseph Polonsky and Gerard Melchior, Paris, France, assignors to Compagnie Generale de Telegraphie Sans Fil, a corporation of France Substituted for abandoned application Serial No. 320,454, November 14, 1952. This application March 31, 1953, Serial No. 345,844

6 Claims. (Cl. 178—7.1)

This invention relates to television transmitters and has for its object to provide improved and simple means for restoring mean shading in such transmitters. The present application is a substitute for applicant's prior application Serial Number 320,454, which has been abandoned.

The invention is illustrated in and explained in connection with the accompanying drawings in which.

Figure 1:
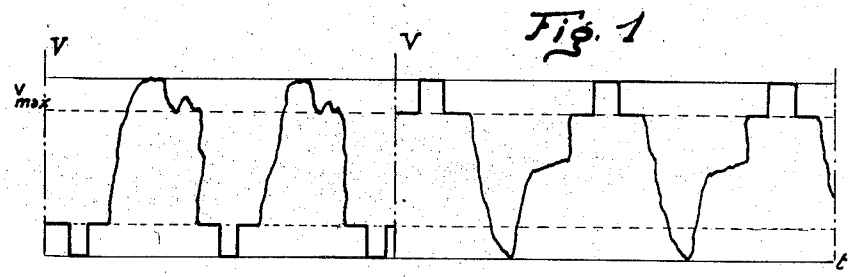
Figure 1 shows conventionally typical present day composite television signal waves for positive and negative signals.

As will be clear from Figure 1 the picture signals proper fall within a definite range of amplitudes, the highest amplitude in this range corresponding to white and the lowest amplitude to black where the signal is positive (the case illustrated in the left-hand part of the figure) or vice versa in the case of a negative signal (the right-hand part of the figure). The picture signals are sub-divided into parts of equal length, each corresponding to one line of the image to be transmitted, and separated from one another by synchronising impulses beyond black level ("blacker than black") each impulse being preceded and followed by two horizontal portions (so-called front and back "porches") at black level. Correct transmission of the mean shading of the picture requires, as is well known, that these porches remain strictly in alignment at black level despite possible variations in the mean level of the whole signal composite signal wave. Satisfaction of this requirement involves that the video amplifiers must be able to transmit the D. C. component of the signal i. e. their pass band must extend from zero frequency up to a maximum video signal the system is intended to handle.

In order to avoid the inconvenience of having D. C. amplifiers all along the video signal chain, it is well known to use the expedient of D. C. restoration i. e. restoring the mean component line by line to secure alignment line by line of the black level porches. This expedient provides faithful transmission of slow variations of the mean shading of the picture; and the video amplifiers can be such as to have coupling time constants capable merely of transmitting a constant voltage for the duration of one line only—in normal practice generally 50 to 100 microseconds or thereabouts.

There are several known types of circuit for giving restoration of the mean shading at the output of a television transmitter. Three well known types are (*a*) that in which D. C. restoration is effected by a diode (*b*) that in which a so-called "clamping" electronic switch is used and (*c*) that in which a negative feed-back chain is employed. Types (*a*) and (*b*) can, however, be used only in connection with tubes working without grid current, for only the negative feed-back type of circuit is capable of correcting non-linear distoration at low frequencies which occur with wide band high frequency stages and video stages working with grid current. It will be appreciated that the mean anode and grid current of the high frequency stages is a function of the mean shading of the image. It follows that any variation of impedance of associated high tension and bias potential sources in the frequency range extending from zero to about 10,000 c./s. will produce distortion in the video signal as also will variation of mains voltage. Only negative feed-back will enable distortions of this nature to be eliminated. However, negative feed-back circuits as known and used hitherto for the purposes now in question have the defects of being complex and expensive mainly because the pass band of the negative feed-back loop must be wide enough to be effective, but nevertheless narrow enough to comply with Nyquist's criterion so as not to cause self-oscillation.

The present invention seeks to provide improved negative feed-back arrangements for use for the purposes stated which shall be very effective and at the same time simple and economical.

According to the invention, a negative feed-back loop provided between a television transmitter output circuit and a video stage of said transmitter to receive line by line D. C. restoration comprises a wide pass-band video detector coupled to said output circuit and serving to restore the video signals; a first electronic switch connected to said detector by associated circuits whose pass-band width exceeds 2 mc./s. and which, during part of the duration of one of the black level synchronising signal porches connects said detector with an integrator circuit, the wide pass-band of said associated circuits permitting the distortionless passage of the said black level porches; and a second electronic switch, in cascade with the first, which connects said integrator, during the same part of the duration of the black level porch with the grid of the video tube to which negative feed-back is to be applied, the pass-band of the circuits connecting said first switch to the grid of said video tube being relatively narrow (of the order of 50 to 100 kc./s.), in order to ensure stability of the negative feed-back loop by respecting Nyquist's criterion, and at the same time being sufficient to transmit correction signals on passage of each line.

In one embodiment of the invention each of the two electronic switches comprises four diodes connected in a bridge circuit and being arranged to be rendered conductive by means of a series of voltage impulses occurring in predetermined phase relation with the synchronising impulses and having a pre-determined required delay with respect thereto.

In another embodiment, an amplitude clipper is connected between the detector and the first switch, said clipper limiting the amplitude of the television signals to a value a little above and below black level, so as to retain only a portion of the amplitude range, for example twenty percent of the amplitude range of the original signal.

Figure 2:
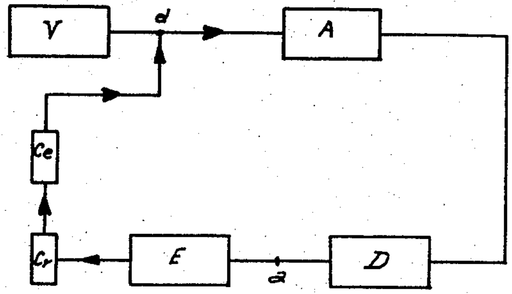
Figure 2 is a block diagram illustrating the invention.

Referring to Figure 2, V represents the preliminary video stages and A the D. C. coupled video stages and modulated high frequency stages of a radio television transmitter.

A negative feed-back chain fed with output from A comprises, in accordance with the invention, first a wide band video detector D, which, fed with the modulated high frequency signal, produces therefrom a composite signal wave as typified by Figure 1, i. e. wave comprising picture signals and synchronising impulses. This detector feeds into associated circuits E of a first electronic switch $C_r$. These circuits are of the wide band type and comprise essentially a clipper designed to clip the video signal on both sides of black level, so as to retain approximately only a 20% amplitude portion of the original signal. The purpose of this clipper will be explained later on. The purpose of the first electronic switch $C_r$ is to open the negative feed-back loop on passage of the black level porch.

The purpose of the limiter at E will now, it is thought, be apparent. Since the function of the switch is to open the feed-back channel only only on the passage of the black level porch, it is unnecessary to retain at its input picture signals of high amplitude such as picture signals corresponding to whites in the picture and at the base of the synchronising impulses and their elimination reduces liability to interference or disturbance by possible high frequency parasitic signals which might pass through the self capacities of the diodes in the switch as well as making the signals which are required to operate the switch a larger proportion of the total amplitude range fed thereto.

At $C_e$ is shown the second electronic switch which is in cascade with the first. The function of this switch will be understood from the following:

The synchronising signal porch—for example the rear porch—applied to the first electronic switch must be perfectly horizontal if the black alignment level is to be clearly determined and this means in practice that the width of the pass-band of the negative feed-back loop preceding the first switch must be at least 2 mc./s. However, the output from the first switch cannot be applied direct to the grid of the video tube to which negative feed-back is to be applied for reasons of stability since it is not practically possible to satisfy Nyquist's criterion for absence of self-oscillation over so wide a frequency band.

The second switch acts as a separator between the integrator circuit (not separately shown in Figure 2) placed between the two switches and the grid of the tube of the video stage to which negative feed-back is to be applied. This integrator circuit has a time constant such that Nyquist's criterion is satisfied for the negative feed-back loop while at the same time variations of black level occurring at line frequency (in practice 10 to 20 kc./s.) are faithfully transmitted to said video stage. The second switch $C_e$ provides an infinite impedance during transmission of the video signal and video frequency coupling between points *b* and *f* is prevented. In addition, the second switch $C_e$ restores at point *b* (Fig. 3) the direct-current component of the video signal as, during the transmission of the black level porches, points *b* and *f* are at the same potential, the second switch then being a short circuit. Thus, the feedback loop comprised of units D, E and $C_r$ (Fig. 2) only has to perform the function of correcting the distortion introduced by stages A.

The ratio of the voltage at *a* (Figure 2) to that at *d* defines the negative feed-back ratio and determines what may be called the black level alignment factor.

Figure 4:
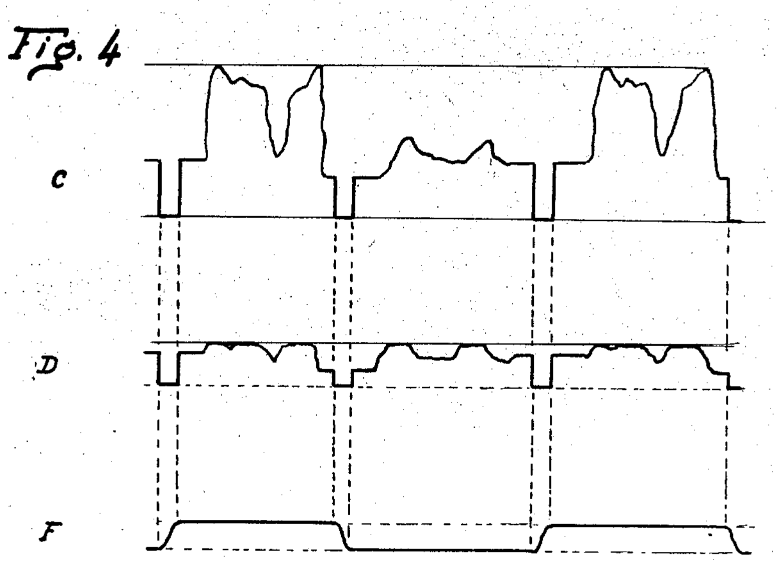
Figure 4 is a graphical figure showing a series of signals to explain the operation of an embodiment of the invention.
Figure 3:
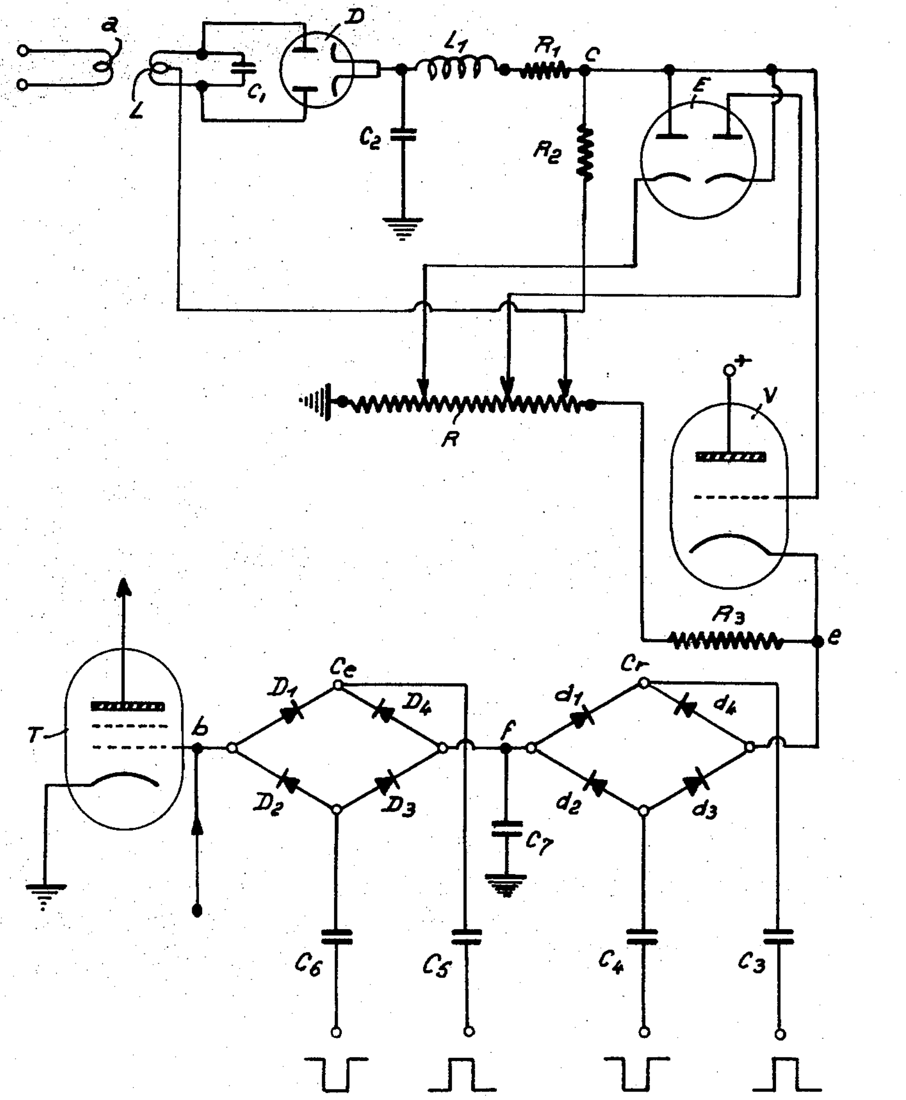
Figure 3 is a diagram of an embodiment of the invention.

Figure 3 is a more detailed diagrammatic representation of the embodiment shown in the block diagram of Figure 2 and Figure 4 shows the wave forms at different parts of the circuit of Figure 3.

Referring to Figure 3 *a* represents the coupling transformer to the input end of the negative feed-back loop from the output of a modulated high-frequency stage at A in Figure 2 (not shown in Figure 3). This transformer consists of two coils of which the secondary L has a centre tap connected to a D. C. potential source represented by the potentiometer resistance R. Across the coil L is connected a tuning condenser $C_1$.

The ends of the secondary are connected to the anodes of a double diode D (which constitutes the detector D of Figure 2), the cathode circuit of which includes a low-pass filter comprising capacity $C_2$ and inductance $L_1$ designed to pass carrier frequency currents to earth and to transmit video and synchronising signals to the grid of the tube V. One anode and one cathode of a second double diode E are connected to the grid of valve V, the remaining electrodes of this double diode being connected to suitable points on resistance R so as to act as a symmetrical amplitude clipper as already described.

The cathode and anode of the tube E are polarised (by connection to the taps on R) in such manner that the signals are clipped down to an amplitude range of the order of 20% of that of the signals before clipping. The clipped signals are fed to the grid of the tube V which is connected as a so-called cathode follower with its anode connected to a suitable high tension source (not shown) and its cathode connected through the resistance $R_3$ to a bias resistance R. This cathode follower arrangement acts as an impedance transformer and, as will be seen, its cathode is connected to the input end of the electronic switch $C_r$.

This electronic switch comprises four diodes $d_1$, $d_2$, $d_3$, $d_4$ connected in a bridge arrangement with the pass directions as indicated in Figure 3. Normally these diodes are cut off but are rendered conductive at the time of the passage of a black level porch by impulses of suitable intensity, which are positive for the diodes $d_1$ and $d_4$ and negative for the diodes $d_2$, $d_3$ and are injected respectively into the anode terminals of $d_1$ and $d_4$, and the cathode terminals of $d_2$ and $d_3$, and are synchronised in any convenient known way with the synchronising impulses though delayed with respect thereto. The positive impulses are injected through a coupling capacity $C_3$, and the negative impulses through a coupling capacity $C_4$ as indicated.

Figure 5:
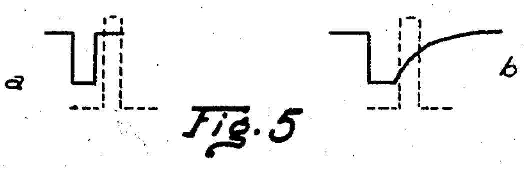
Figure 5 shows the sort of deformation of a black level porch which occurs if there is an insufficient width of pass band in the apparatus preceding the first switch.

Figure 5 shows at *a*, in solid lines, two black level porches, one each side of a synchronising impulse, while in broken lines in shown the impulse which unblocks the electronic switch $C_r$, to open the channel to video signals in the negative feed-back loop at the moment of the passage of the porch, which follows the synchronisation impulse, for example, i. e. the rear porch. If the time constant of the circuit between the detector D and the switch $C_r$, is too long, the black level porch may be deformed as at *b*. In other words, in order that the alignment shelf may not be deformed, the pass-band of the part of the negative feed-back loop preceding the switch $C_r$ must be sufficiently wide, for example of the order of one-third of the band to be transmitted. As has already been stated the Nyquist criterion is not satisfied for so wide a band.

In order to prevent self-oscillation through the negative feed-back loop, the switch $C_r$ is followed by an integrating capacity $C_7$ (the resistance of the integration circuit is determined by the internal resistance of the diodes of the first switch) and by the electronic switch $C_e$, which is similar to the switch $C_r$ and comprises the diodes $D_1$, $D_2$, $D_3$, $D_4$ connected in a bridge arrangement with diodes connected as shown, these diodes being unlocked by impulses synchronised in suitable manner with the synchronising impulses and introduced through capacities $C_5$ and $C_6$.

The output from this switch is applied at *b* to the grid of the tube T of a video stage (point *d* of Figure 2).

The operation of the circuit of Figure 3 will be clear from Figure 4, which shows the wave forms at various points in Figure 3.

Referring to Figure 4, C shows the wave form at *c* before passage into the clipper E. This is a normal television signal (synchronising impulses plus picture signals). After clipping the wave form (at *d* of Figure 3) is as shown at D in Figure 4, with a maximum amplitude of the order of 20% of the maximum amplitude of the preceding curve C.

The first electronic switch opens only on passage of a black level shelf, but at its output, because of the integration circuit including the capacity $C_7$, a stepped signal as shown at F in Figure 4 is obtained, the duration of each steady portion of which corresponds to the duration of one image scanning line (curve F).

During the duration of the black level porches, the switch $C_e$ transmits the stepped curve to the grid of the video stage.

To sum up, the arrangement described, in spite of its simplicity, permits the obtaining of excellent alignment of the black level at the output of a television transmitter (to within 1%), despite variations of this level in the high power stages due particularly to variations of voltages in dependence on the image content. The invention enables substantial economies as respects the dimensions of power rectifiers and filters to be effected.

We claim:

1. In a television transmitter an arrangement for restoring the mean shading of the picture at the output circuit of a transmitter by alignment line by line of the black level porches of the type constituted by a negative feedback path completed between said output circuit of said transmitter and a video stage thereof during at least part of the period of transmission of the video signal in which said path comprises in combination: a video detector coupled to said output circuit, a first electronic switch coupled to said detector by circuits the pass-band of which is at least equal to one third of the video band to be transmitted, an integrator circuit, means controlling said switch to connect said detector through said circuits to said integrator circuit during at least part of the period of transmission of the rear black level porches of the synchronizing signals, a second electric switch coupled on the one hand to said integrator circuit and on the other hand to the input of said video stage, pass band circuits between said first switch and said video stage input being of the order of 50 to 100 kc./s. wide, and means controlling said second switch to effect this connection during the same intervals of time as those in which said first switch effects connection.

2. An arrangement as claimed in claim 1, comprising a clipper circuit inserted between said detector and said first electronic switch, said clipper circuit limiting the amplitude of the television signals to a little below and a little above black level, said limited amplitude being about twenty percent of that of the original signal.

3. An arrangement as claimed in claim 1, comprising a clipper circuit inserted between said detector and said first electronic switch, said clipper circuit limiting the amplitude of the television signals to a little below and a little above black level, said limited amplitude being about twenty percent of that of the original signal and a tube connected as a cathode follower inserted between said clipper circuit and said first switch, the grid of said tube being connected to receive the signals from said clipper circuit the cathode of said tube being connected to the input of said first switch, said tube functioning as an impedance transformer.

4. An arrangement as claimed in claim 1, in which said two electronic switches are constituted each in the form of four rectifiers connected in a bridge arrangement and back to back, means being provided to render these rectifiers normally non-conductive, the input of the signals being effected at one of the corners of the bridge simultaneously on the anode of one rectifier and on the cathode of a second, the output being taken from the diagonally opposite apex, means being provided for applying a series of positive and negative impulses respectively and simultaneously to the two other corners of the bridge, and means being provided for synchronising said impulses with and in predetermined phase relation with the synchronising impulses of the television signal to render said switches conductive at the moment of the transmission of the rear porches.

5. An arrangement as claimed in claim 1, in which said two electronic switches are constituted each in the form of four rectifiers connected in a bridge arrangement and back to back, means being provided to render these rectifiers non-conductive, the input of the signals being effected at one of the corners of the bridge simultaneously on the anode of one rectifier and on the cathode of a second, the output being taken from the diagonally opposite apex, means being provided for applying a series of positive and negative impulses respectively and simultaneously to the two other corners of the bridge, and means being provided for synchronising said impulses with and in predetermined phase relation with the synchronising impulses of the television signal to render said switches conductive at the moment of the transmission of the rear porches, the integrator circuit including a capacity inserted between earth and a connection connecting the output of the first switch to the input of the second, the resistance of said integrator circuit being provided by the internal resistance of the rectifiers.

6. Apparatus in a television system for restoring the mean shading of the picture signal on a transmission channel by line-by-line alignment of the black level porches of the signal including a feedback circuit coupling one stage in the channel with a prior stage, said feedback circuit having means for producing a feedback correction signal, an integrator circuit, first circuit means for coupling said integrator circuit to the input end of the feedback circuit having a band pass width equal to at least one third of the band pass width of the picture signal, said first circuit means comprising a first switching circuit for completing the circuit to the integrator, second circuit means for coupling the integrator circuit to the output end of the feedback circuit having a band pass width substantially narrower than that of the first circuit means such that Nyquist's criterion for preventing self-oscillation is obeyed, said second circuit means including a second switching circuit for completing the circuit from the integrator to the output end of the feedback circuit, and means for operating said first and second switching circuits during at least a portion of the period of the black level porches to thereby complete the feedback circuit during said period.

References Cited in the file of this patent

UNITED STATES PATENTS

| | | |
|---|---|---|
| 2,292,816 | Bedford | Aug. 11, 1942 |
| 2,307,375 | Blumlein et al. | Jan. 5, 1943 |
| 2,620,392 | Lax | Dec. 2, 1952 |

OTHER REFERENCES

"RCA Radiotron Designer's Handbook," fourth ed., 1954, chapter VII.